(12) United States Patent
Kim et al.

(10) Patent No.: US 7,206,613 B2
(45) Date of Patent: Apr. 17, 2007

(54) METHOD AND APPARATUS FOR ADJUSTING LEVEL OF ALERT SOUND IN PORTABLE TELEPHONE

(75) Inventors: Bok-Ki Kim, Kumi-shi (KR); Seog-Geun Lee, Kumi-shi (KR)

(73) Assignee: Samsung Electronics Co., Ltd. (KR)

( * ) Notice: Subject to any disclaimer, the term of this patent is extended or adjusted under 35 U.S.C. 154(b) by 927 days.

(21) Appl. No.: 10/021,925

(22) Filed: Dec. 13, 2001

(65) Prior Publication Data

US 2003/0013496 A1    Jan. 16, 2003

(30) Foreign Application Priority Data

Jul. 16, 2001    (KR) ............... 2001-42834

(51) Int. Cl.
H04B 1/38    (2006.01)
(52) U.S. Cl. ............ 455/567; 455/550.1; 455/156.1; 455/575.3
(58) Field of Classification Search ........... 455/567, 455/550.1, 156.1, 575.3; 379/373.02, 418, 379/379, 373.01
See application file for complete search history.

(56) References Cited

U.S. PATENT DOCUMENTS 5,404,582 A * 4/1995 Demuro et al. .......... 455/550.1
6,560,466 B1 * 5/2003 Skorko ..................... 455/567

FOREIGN PATENT DOCUMENTS

| EP | DE019645751 A | * | 5/1997 |
| JP | 362136951 A | * | 6/1987 |
| JP | 403196745 A | * | 8/1991 |
| JP | 404260256 A | * | 9/1992 |
| JP | 06-307488 | * | 11/1996 |
| JP | 2000036853 A | * | 2/2000 |
| JP | 02000152323 A | * | 5/2000 |
| JP | 02000270048 A | * | 9/2000 |

* cited by examiner

Primary Examiner—Melur Ramakrishnaiah
(74) Attorney, Agent, or Firm—The Farrell Law Firm

(57) ABSTRACT

Disclosed is a method and apparatus for adjusting alert sound which can prevent a user from being surprised or suffering ear damage by abrupt alert sound. According to the invention, alert sound is generated in a low level set lower than a normal level when an incoming call is received, and then the level of alert sound is adjusted to the normal level after a predetermined time period.

5 Claims, 3 Drawing Sheets

METHOD AND APPARATUS FOR ADJUSTING LEVEL OF ALERT SOUND IN PORTABLE TELEPHONE

PRIORITY

This application claims priority to an application entitled "METHOD AND APPARATUS FOR ADJUSTING LEVEL OF ALERT SOUND IN PORTABLE TELEPHONE" applied with the Korean Industrial Property Office on Jul. 16, 2001 and assigned Serial No. 2001-42834, the contents of which is hereby incorporated by reference.

BACKGROUND OF THE INVENTION

1. Field of the Invention

The invention relates to a portable telephone, and more particularly, to a method and apparatus for generating an alert sound in response to an incoming call.

2. Description of the Related Art

In general, a portable telephone informs a user of an incoming call through generation of an alert sound, vibration or flickering of a lamp. The user selects one of the available modes from these various call alert modes. To implement the alert sound mode, a buzzer has been used in conventional portable telephones.

During the use of the portable telephone it is closely contacted or placed adjacent to an ear by the user. Upon receiving an incoming call, when the portable telephone is closely contacted or placed adjacent to the ear of the user, an abrupt alert sound may sometimes frighten the user or cause damage to the ear. Examples of this instance include when the incoming call is generated before distancing the portable telephone after conversation is completed, and when the portable telephone is placed near the ear before starting conversation after a send key is pressed.

Lately, in particular, the alert sound tends to be produced in various multi-chord bell sounds such as 4 chords and 16 chords, which are produced via a speaker. If such a speaker for outputting the alert sound is installed in the portable telephone separately from a speaker for outputting voice, the portable telephone is restricted in size or design of the outer shape. Therefore, the speaker installed in the receiver is being used in common for outputting a voice and the alert sound.

In such a portable telephone using one speaker installed in the receiver in common for outputting the voice and the alert sound, the abrupt alert sound may surprise the user or cause damage to the ear as severe problems. This is because the alert sound is produced via the speaker in the receiver contacted to the ear by the user and has a sound volume level higher than a buzzer.

As described above, there is a problem that the user may be surprised or suffer damage in the ear due to the abrupt alert sound when the incoming call is received while the receiver of the portable telephone is in close contact or placed adjacent to the ear of the user.

SUMMARY OF THE INVENTION

Accordingly, the present invention has been made to solve the foregoing problem of the related art and it is an object of the invention to provide a method and apparatus for adjusting an alert sound which can prevent a user from being surprised or suffering damage in an ear by an abrupt alert sound.

According to an embodiment of the invention to obtain the foregoing object, provided is a method in which the alert sound is generated in a low level set lower than a normal level when an incoming call is received, and then the alert sound is adjusted to the normal level when a predetermine time period passes while an incoming call is continued.

When the call is received in this manner, the alert sound is first generated in the low level and then adjusted to the normal level after the predetermined time period, for example 2 seconds, so that the user can recognize the incoming call and accordingly move the portable telephone from the ear to prevent surprise or damage from the alert sound.

If the ear of the user is distanced far from the portable telephone when the alert sound is generated in the low level in receiving the incoming call, the user may not hear the alert sound until it changes to the normal level after the lapse of the predetermined time period. In this case, it may take a long time period until the user responses to the incoming call. Considering such a situation, it is preferable to determine if the alert sound will be generated in the low level or in the normal level based upon opening of the cover, relative to the proximity of the human body to the receiver, or setting of an alert sound adjusting mode. Opening of the cover is a condition applied in consideration that the cover of the portable telephone is opened in use thereof when the portable telephone is a flip or folder type telephone so that the alert sound is generated in the normal level when the cover is closed. Proximity of the human body is a condition applied in order to generate the alert sound in the normal level when the ear of the user is not adjacent to the receiver of the portable telephone. Setting of the incoming call adjusting mode is a condition for allowing the user to selectively use as desired the function for generating the alert sound in the low level according to the invention.

DETAILED DESCRIPTION OF THE PREFERRED EMBODIMENT

In the following detailed description of a preferred embodiment of the invention with reference to the accompanying drawings, detailed description of known functions and configurations will be omitted in that it may unnecessarily obstruct the concept of the invention.

Figure 1:
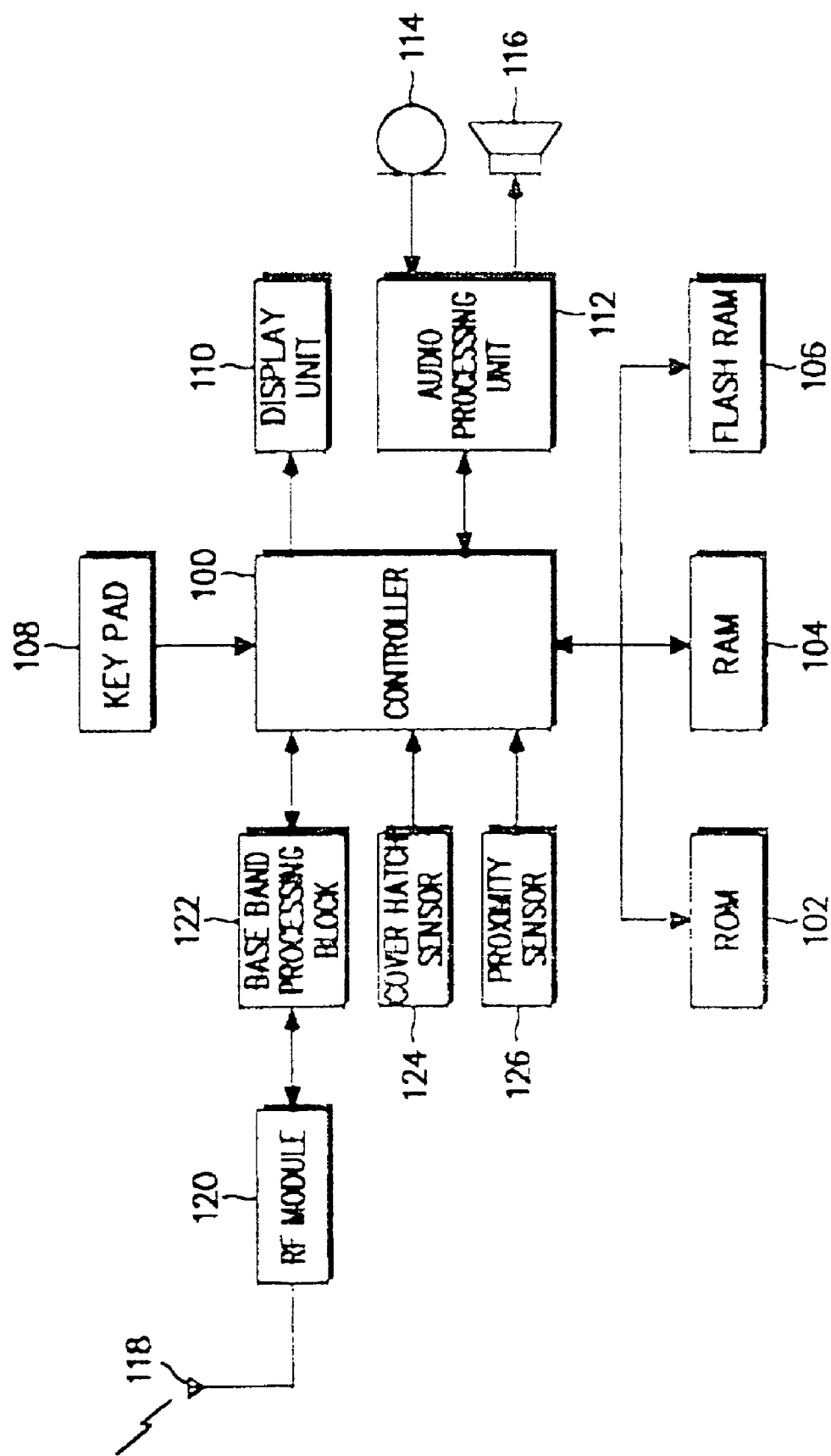
FIG. 1 is a block diagram of a portable telephone including an apparatus for adjusting the level of an alert sound according to an embodiment of the invention.

FIG. 1 is a block diagram of a portable telephone including an apparatus for adjusting the level of an alert sound according to an embodiment of the invention.

Figure 2:
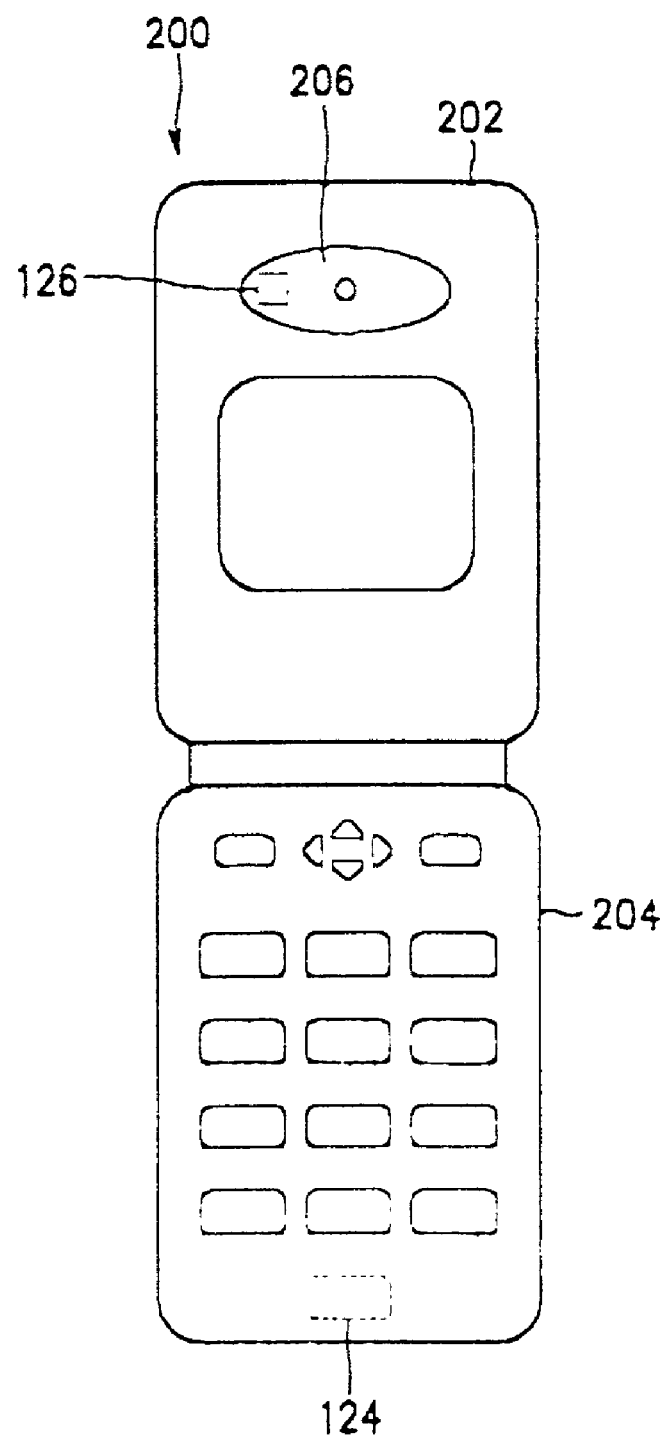
FIG. 2 is an illustration of a proximity sensor installed in a portable telephone according to the embodiment of the invention.

Referring to FIG. 1, a controller 100 is included for processing and controlling various functions including telephone communication, data communication or internet connection, which processes a function of adjusting the alert sound according to an embodiment of the present invention in addition to conventional functions. Description about conventional processing and controlling of the controller 100 will be omitted in the following description. A Read Only Memory (ROM) 102 stores micro codes of programs for processing and controlling of the controller 100 and various reference data. A Random Access Memory (RAM) 104 is provided as a working memory of the controller 100. A flash RAM 106 provides an area for storing various updatable storage data. A key pad 108 has number keys, function keys, and volume keys for providing key input data corresponding to keys pressed by a user to the controller 100. A display unit 110 displays image information according to the control of the controller 100 on a screen. An audio processing unit 112 connected to the controller 100, and a microphone 114 and a speaker 116 connected to the audio processing unit 112 are audio input/output blocks in use for telephone conversation, voice record, alert sound output and the like. Also, a Radio Frequency (RF) module 120 transmits/receives radio signals to/from a mobile telephone base station, i.e., modulates a signal subjected to transmission which is inputted from the controller 100 for transmission of an RF signal via an antenna 118 and demodulates the RF signal received via antenna 118 for providing the demodulated signal to the controller 100 via base band processing block 122. The base band processing block 122 process base band signals transmitted/received between the RF module and the controller 100. A cover hatch sensor 124 detects opening/shutting of a cover and transmits this information to the controller 100. Such a cover hatch sensor 124 is generally installed within a housing 204 in a folder-type portable telephone 200 as shown in FIG. 2. The cover hatch sensor 124 is pressed by a folder 202 when the folder 202 is shut and restored when the folder 202 is opened so as to detect shutting of the folder 202 and opening of the folder 202 as shown in FIG. 2. A proximity sensor 126 for detecting proximity of a human body within a predetermined distance, is installed in a receiver 206 of the portable telephone 200 shown in FIG. 2 for detecting that the human body is adjacent to a receiver 206 within the predetermined distance, and proximity information is sent to the controller 100.

Figure 3:
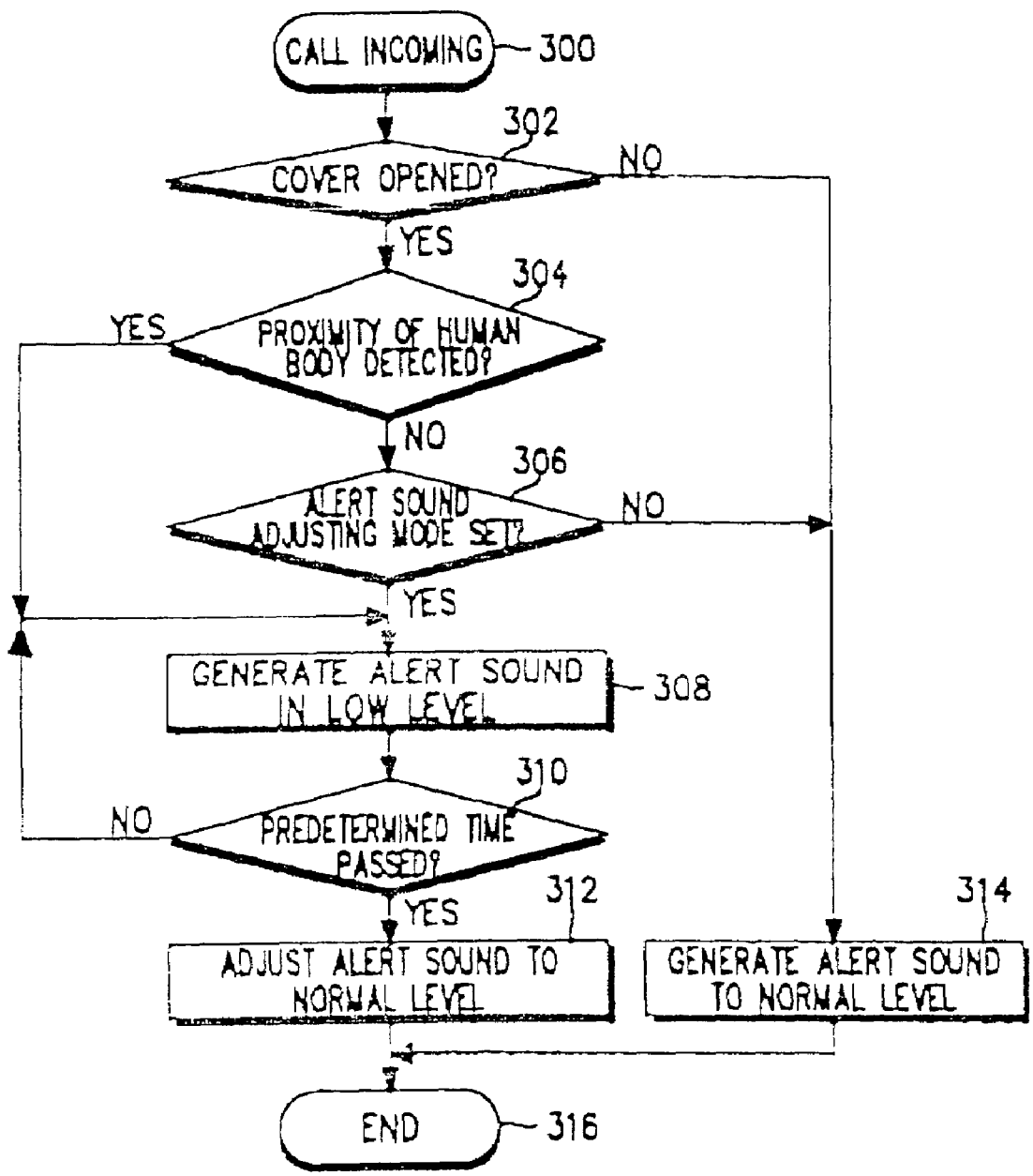
FIG. 3 is a flow chart of processes according to the embodiment of the invention.

FIG. 3 shows a flow chart of steps for adjusting the level of the alert sound in the controller 100 according to the embodiment of the present invention.

Referring to FIG. 3, when an incoming call is received in step 300, the controller 100 inspects if the cover is opened via the cover hatch sensor 124 in step 302. If the cover is not opened, the controller 100 generates the alert sound in a normal level in step 314 and ends the procedure in step 316. On the contrary, if the cover is opened, the proximity sensor 126 determines the proximity of the human body in step 304. If proximity of the human body is detected, i.e., proximity of the human body is detected when the cover is opened, the alert sound is generated in a level set lower than the normal level in step 308. In this case, the low level is pre-set in a level so that the user will not be surprised or damage in the ear by the alert sound even though the receiver of the portable telephone is closely contacted or placed adjacent to the ear of the user. Such a level can be set very low considering that the receiver is in close contact or placed adjacent to the ear. Then, after a predetermine time period has passed in step 310, i.e., a predetermined time period has passed while the incoming call is continued after output of the alert sound is started in the low level, the level of the alert sound is adjusted to the normal level in step 312.

Meanwhile, when proximity to the human body is not detected in step 304, it is determined in step 306, if an alert sound adjusting mode is set. The alert sound adjusting mode is additionally set in a menu for setting a general alert type so that the user can select to set the mode. If the alert sound adjusting mode is not set, execution proceeds to step 314 to generate a normal level alert sound and if the alert sound adjusting mode is set, execution proceeds to step 308, where a low level alert sound is generated. The process continues to step 310 to determine if a predetermined time has passed. This predetermined time can be set in a menu for setting a general alert type. If the predetermined time has not passed the process returns to step 308. If the predetermined time has passed the process proceeds to step 312 and the alert sound is adjusted to the normal level.

After steps 312 and 314 are executed, the level of the alert sound is adjusted according to embodiment of the invention and the process ends in step 316. Then, when the user replies to the incoming call or a sender hangs up the telephone to end reception of an incoming call, a corresponding conventional process is executed. The conventional process is executed if the incoming call is completed before the predetermined time has passed also in steps 308 and 310.

Therefore, the alert sound is generated in the low level in the initial stage and adjusted to the normal level after the predetermined time period so that the user can recognize the incoming call and accordingly remove the portable telephone from the ear to cope with the alert sound in the normal level. This allows the user to be protected from surprise or damage in the ear by an abrupt alert sound, regardless of the manner in which the user is using the portable telephone.

Meanwhile, while the foregoing description has been made about a detailed embodiment of the invention, a number of variations can be executed without departing from the scope of the invention. In particular, while the embodiment of the invention has been described via examples in which opening of the cover, proximity of the human body to the receiver and setting of the alert sound adjusting mode are all applied as conditions for determining the level of the alert sound, application can be made that alert sound is unconditionally generated in the low level in the existence of the incoming call before adjusted to the normal level, and at least one of the conditions can be alternatively applied. Moreover, while description has been made that the alert sound is adjusted in two levels of the low level and the normal level, the alert sound can be adjusted to have more levels. Therefore, the scope of the invention is not limited by the foregoing embodiment but will be defined by the accompanying claims and the equivalents thereof.

What is claimed is:

1. A method for adjusting an alert sound in a portable telephone to prevent surprise or damage from the alert sound, comprising the steps of:

determining whether a user is proximate to the portable telephone, and if it is determined that the user is proximate to the portable telephone, determining whether an alert sound adjusting mode is set when an incoming call is received;

generating the alert sound in a first level, if it is determined that the alert sound adjusting mode is not set;

generating the alert sound in a low level lower than the first level, if it is determined that the alert sound adjusting mode is set; and adjusting the level of the alert sound to the first level after a predetermined time period, thereby allowing a user to recognize the incoming call and to move the portable telephone to prevent surprise or damage from the alert sound.

2. A method for generating an alert sound in a portable telephone having a proximity sensor installed in a receiver for detecting if a human body is adjacent to the receiver within a predetermined distance, said method comprising the following steps of:

determining if the human body is adjacent to the receiver when an incoming call is received to the receiver;

initially generating the alert sound in a normal level, if the human body is not detected adjacent to the receiver;

initially generating the alert sound in a low level lower than the normal level, if the human body is detected adjacent to the receiver; and adjusting the level of the alert sound to the normal level after a certain time period.

3. A method of generating an alert sound in a portable telephone which has a flip or folder-type cover, a cover hatch sensor for detecting whether the cover is open or shut and a proximity sensor installed in a receiver for detecting if a human body is adjacent to the receiver within a predetermined distance, comprising the steps of:

determining if the cover is open and thereafter determining whether the human body is adjacent to the receiver based on the results of the determination of whether the cover is open, when an incoming call is received;

generating the alert sound in a normal level, if the cover is not open or the human body is not detected adjacent to the receiver;

generating the alert sound in a low level lower than the normal level, if the human body is detected adjacent to the receiver or the cover is open; and adjusting the level of the alert sound to the normal level after a certain time period.

4. An apparatus for adjusting the level of an alert sound in a portable telephone having a flip or folder-type cover, said apparatus comprising:

a proximity sensor installed in a receiver for detecting if a human body is adjacent to the receiver within a predetermined distance;

an audio processing unit for generating and outputting the alert sound via a speaker; and a controller for inspecting if the human body is adjacent to the receiver when an incoming call is received, initially generating the alert sound in a normal level through control of said audio processing unit if the human body is not detected adjacent to the receiver, initially generating the alert sound in a low level lower than the normal level through control of said audio processing unit if the human body is detected adjacent to the receiver, and adjusting the level of the alert sound to the normal level after a certain time period.

5. An apparatus for adjusting the level of an alert sound in a portable telephone having a flip or folder-type cover, said apparatus comprising:

a cover hatch sensor for detecting if the cover is open;

a proximity sensor installed in a receiver for detecting if a human body is adjacent to the receiver within a predetermined distance;

an audio processing unit for generating and outputting the alert sound via a speaker; and a controller for determining whether the cover is open and if it is determined that the cover is open, determining whether the human body is adjacent to the receiver when an incoming call is received, generating the alert sound in a normal level through control of said audio processing unit if it is determined that the cover is not open, generating the alert sound in a low level lower than the normal level through control of said audio processing unit if it is determined that the cover is open and the human body is detected adjacent to the receiver, and adjusting the level of the alert sound to the normal level after a certain time period.

* * * * *